(12) United States Patent
Wu et al.

(10) Patent No.: US 8,767,586 B2
(45) Date of Patent: Jul. 1, 2014

(54) METHODS, SYSTEMS, AND PRODUCTS FOR NETWORK TOPOLOGY

(75) Inventors: Xidong Wu, San Ramon, CA (US); Mark H. Brady, San Ramon, CA (US); Jin Wang, Fremont, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 297 days.

(21) Appl. No.: 13/163,844

(22) Filed: Jun. 20, 2011

(65) Prior Publication Data

US 2012/0320789 A1 Dec. 20, 2012

(51) Int. Cl.
*H04L 12/28* (2006.01)

(52) U.S. Cl.
USPC ........... 370/254; 370/252; 709/220; 709/224; 709/201

(58) Field of Classification Search
CPC ......... H04L 41/12; H04L 41/22; H04L 45/02; H04L 29/06; H04L 29/08072
USPC ................... 370/254, 252; 709/220, 224, 201
See application file for complete search history.

(56) References Cited

U.S. PATENT DOCUMENTS

| | | | |
|---|---|---|---|
| 5,063,520 A | 11/1991 | Klein | |
| 5,926,463 A * | 7/1999 | Ahearn et al. | 370/254 |
| 6,636,239 B1 | 10/2003 | Arquie et al. | |
| 7,092,861 B1 | 8/2006 | Shteyn | |
| 7,222,153 B2 | 5/2007 | Ando et al. | |
| 7,231,592 B2 | 6/2007 | Humpleman et al. | |
| 7,337,217 B2 | 2/2008 | Wang | |
| 7,583,587 B2 | 9/2009 | Qiu et al. | |
| 7,607,091 B2 | 10/2009 | Song | |
| 7,765,294 B2 | 7/2010 | Edwards et al. | |
| 2001/0034754 A1 | 10/2001 | Elwahab et al. | |
| 2006/0215650 A1* | 9/2006 | Wollmershauser et al. | 370/389 |
| 2009/0259746 A1 | 10/2009 | Sasaki | |
| 2010/0262467 A1 | 10/2010 | Barnhill, Jr. et al. | |
| 2011/0085530 A1 | 4/2011 | Hellhake et al. | |
| 2012/0144336 A1* | 6/2012 | Pinter et al. | 715/772 |

* cited by examiner

*Primary Examiner* — Jamal Javaid
(74) *Attorney, Agent, or Firm* — Scott P. Zimmerman, PLLC

(57) ABSTRACT

Methods, systems, and products simulate a topology of a residential home network. The residential home network has a residential gateway and one or more devices communicating with the residential gateway. Each device is queried by the residential gateway for configuration and performance data. A simulated view of a topology of the residential home network is then generated.

2 Claims, 11 Drawing Sheets

METHODS, SYSTEMS, AND PRODUCTS FOR NETWORK TOPOLOGY

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Exemplary embodiments generally relate to data processing and operator interfaces, to error detection/correction and fault detection/recovery, and to electrical computers and, more particularly, to graphical or iconic-based interfaces, to network path component faults, to computer network monitoring, and to diagnostic testing of local area networks.

Home networks are increasingly complex. Home networks include many diverse devices of different manufactures, types, and configurations. Home networks may also include wired and wireless links to these diverse devices. This complexity makes diagnosis and repair increasingly difficult.

BRIEF DESCRIPTION OF THE SEVERAL VIEWS OF THE DRAWINGS

The features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. May be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
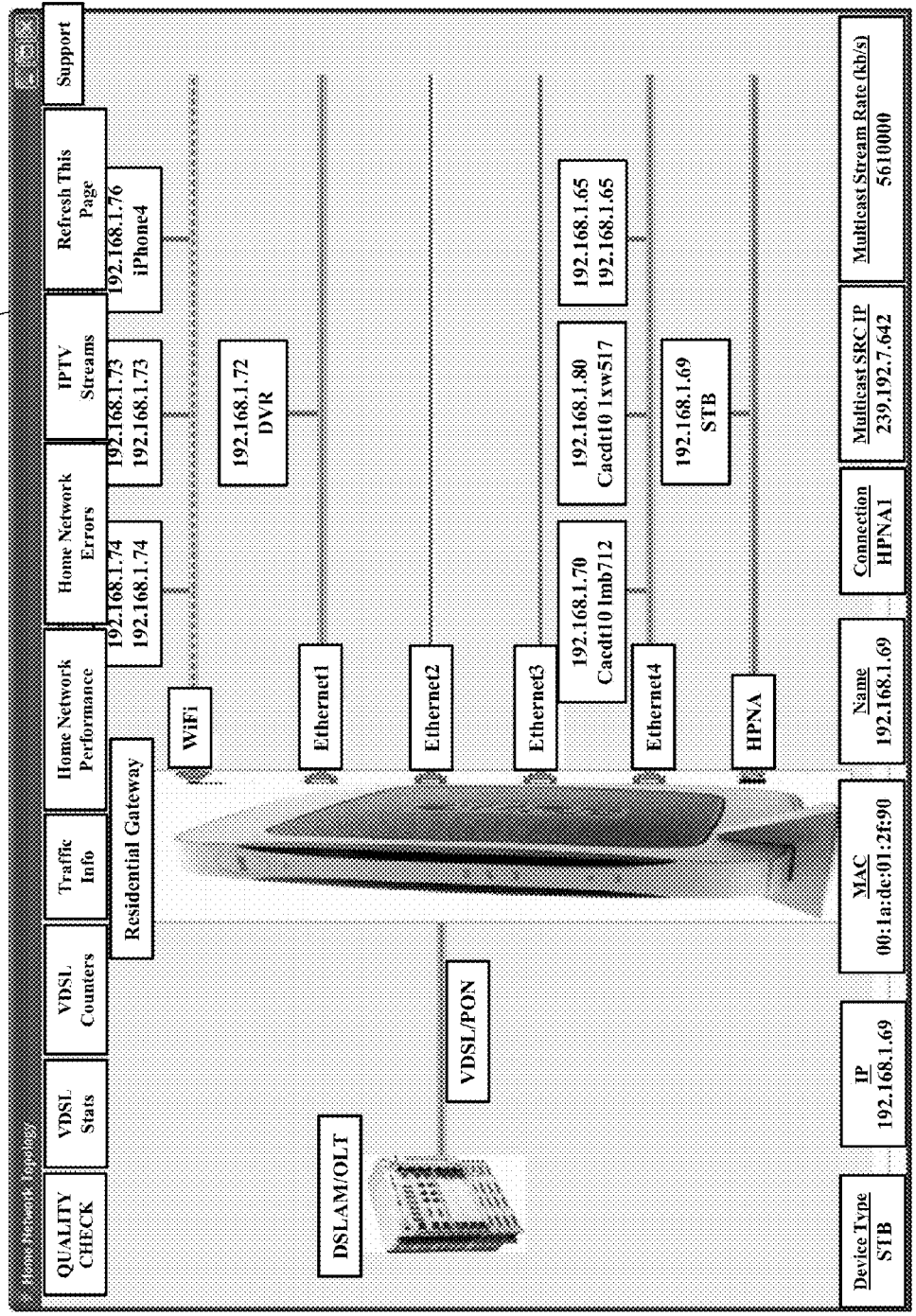
FIG. 1 is a simplified schematic illustrating a graphical user interface, according to exemplary embodiments.

FIG. 1 is a simplified schematic illustrating a graphical user interface 20, according to exemplary embodiments. The graphical user interface 20 is a user-friendly operator interface for managing and for diagnosing a home network. The graphical user interface 20 provides network information and device information in a simple, easy-to-understand home network management tool. The graphical user interface 20 permits even the most novice users (whether a home customer or a repair technician) to quickly and easily diagnose and isolate network and device problems in the home network. As the user gains more experience and knowledge of the graphical user interface 20, the user may obtain select options that provide even more detailed technical information concerning the home network and/or any devices connected to the home network.

Figure 2:
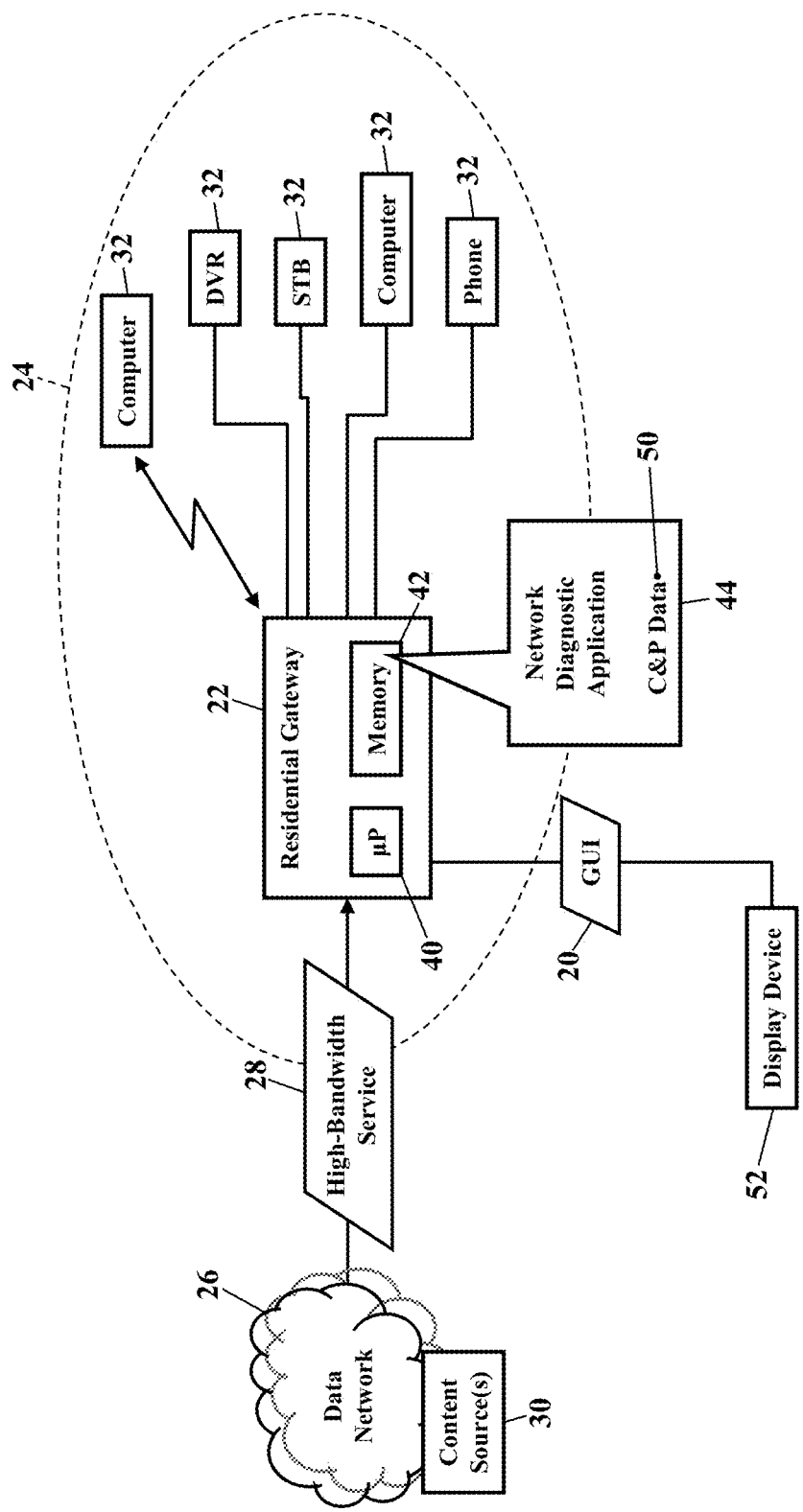
FIG. 2 is a schematic illustrating an environment in which exemplary embodiments may be implemented.

Before further explaining the graphical user interface 20, though, FIG. 2 is a schematic illustrating an environment in which exemplary embodiments may be implemented. FIG. 2 illustrates a residential gateway 22 communicating with a home network 24 and with a data network 26. The residential gateway 22 receives high bandwidth service 28 from one or more content sources 30. The residential gateway 22 distributes the high bandwidth service 28 to various devices 32 in the home network 24. The residential gateway 22, for example, may have an interface to receive high-bandwidth digital subscriber line (or "DSL") signals. The residential gateway 22 may have a DSL jack for connection to a digital subscriber line. The residential gateway 22 receives digital subscriber line signals and an internal interface (such as a DSL modem)

processes the digital subscriber line signals for distribution to the home network 24. The residential gateway 22, however, may additionally or alternatively have inputs and interfaces to other high-bandwidth services, such as cable signals from a coaxial cable and an internal interface (such as a cable modem) to receive and process coaxial cable signals. The residential gateway 22 may additionally or alternatively have a satellite antenna terminal for connection to a satellite antenna to receive digital satellite signals. The residential gateway 22 may additionally or alternatively have interfaces to fiber optic lines, the Home Phone Networking Alliance ("HPNA"), wireless BLUETOOTH® and/or WI-FI® links, or any other medium or link. These jacks, connections, and interfaces are all well known and need not be discussed.

The residential gateway 22 may have a processor 40 and memory 42. The processor 40 executes a network diagnostic application 44 stored in the memory 42. The network diagnostic application 44 is a set of software commands or code that instruct the processor 40 to automatically discover and identify the devices 32 physically connected to, and/or wirelessly communicating with, the residential gateway 22. The network diagnostic application 44 queries each device 32 for configuration and performance ("C&P") data 50, as later paragraphs will explain. The network diagnostic application 44 then uses the configuration and performance data 50 to generate the graphical user interface 20. The network diagnostic application 44 may also cause the processor 40 to reproduce the graphical user interface 20 on a display device 52.

The residential gateway 22 may have Ethernet capabilities. The residential gateway 22 may have an Ethernet interface to distribute the high-bandwidth signals to the various devices 32 connected to the residential gateway 22. The residential gateway 22 may have one or more terminals or jacks that physically connect to each device 32. The residential gateway 22 may thus operate as a router that forwards data packets to a destination address in the home network 24. The Ethernet interface and standard are well known to those of ordinary skill in the art, so this disclosure need not further discuss Ethernet capability.

The residential gateway 22 may have wireless capabilities. The residential gateway 22 may include a wireless transceiver that wirelessly transmits and receives wireless signals via an antenna. The wireless transceiver, for example, may transmit and receive wireless signals using the BLUETOOTH® and/or WI-FI® standards for communicating with wireless devices 32. The wireless transceiver, however, may utilize any portion of the electromagnetic spectrum and/or any signaling standard, such as any of the IEEE 802 family of standards. Wireless capability in residential gateways is well known to those of ordinary skill in the art, so this disclosure need not further discuss wireless capability.

The residential gateway 22 may have a telephony interface. The residential gateway 22, for example, may have a phone jack or terminal for connection to telephony devices. A Voice-over Internet Protocol ("VoIP") phone, for example, may interface with the residential gateway 22 to receive Voice-over Internet Protocol signals. Telephony capability in residential gateways is well known to those of ordinary skill in the art, so this disclosure need not further discuss telephony capability.

Figure 3:
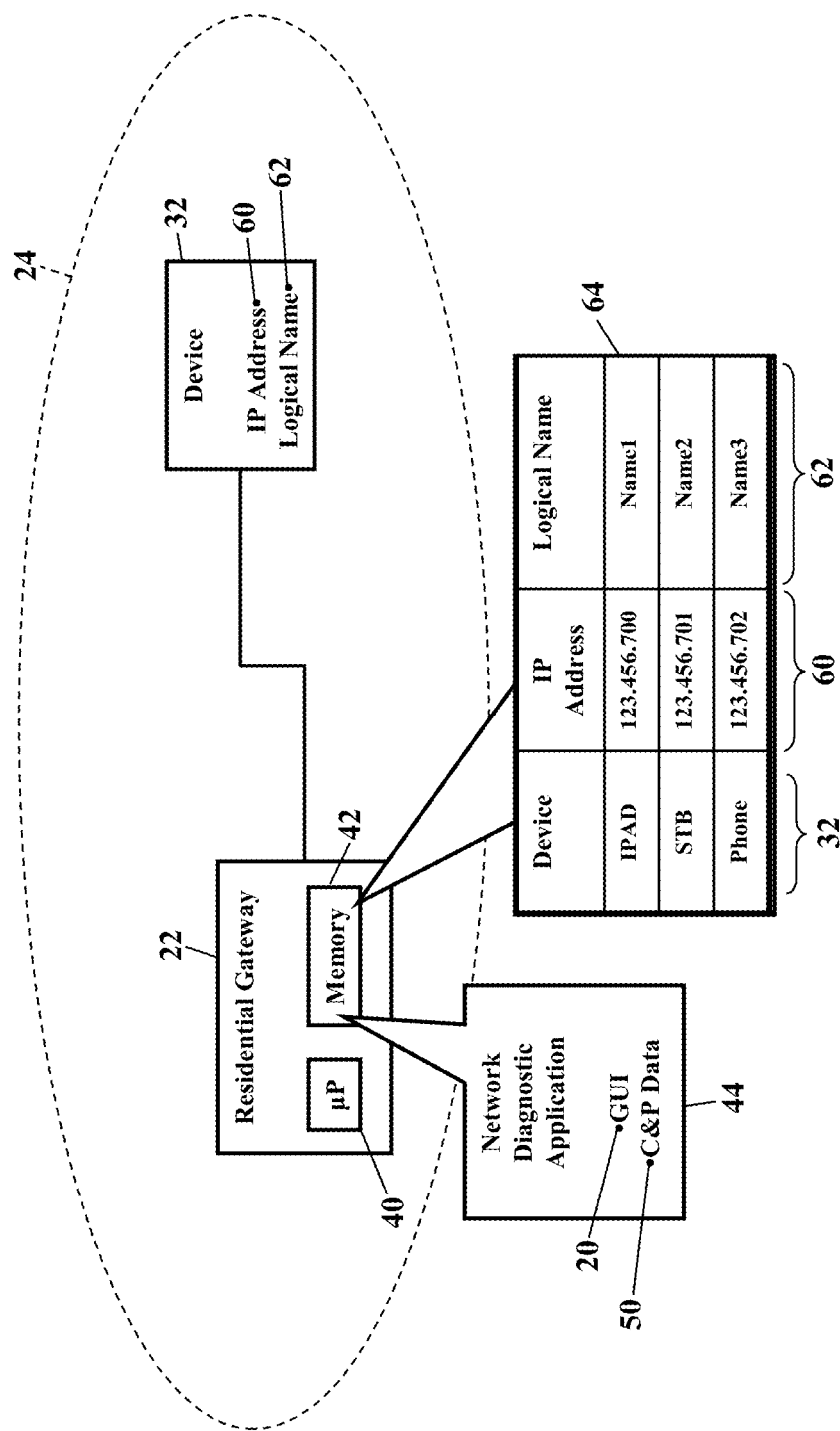
FIG. 3 is a schematic illustrating automatic discovery of devices, according to exemplary embodiments.

FIG. 3 is a schematic illustrating automatic discovery of the devices 32, according to exemplary embodiments. Here the network diagnostic application 44, executing in the residential gateway 22, automatically discovers and identifies the devices 32 physically connected to, and/or wirelessly communicating with, the residential gateway 22. The devices 32 may include one or more modems, set-top boxes, digital video recorders, gaming devices, computers, wireless devices, phones, plug-and-play devices, home automation devices, and security devices and sensors. The network diagnostic application 44, in short, may automatically discover and identify any device connected to, and/or wirelessly communicating with, the residential gateway 22.

The network diagnostic application 44, for example, may use the Transmission Control Protocol/Internet Protocol (TCP/IP) network protocol. The TCP/IP network protocol is a well-known addressing standard for networking. Each device 32 is associated with a unique Internet Protocol ("IP") address 60 and a logical name 62, which are used to identify a particular device 32 connected to, or communicating with, the residential gateway 22. The network diagnostic application 44 may store and maintain a device table 64 in the memory 42 that maps or associates each device 32 to its corresponding unique IP address 60 and logical name 62. The network diagnostic application 44 may, alternatively, query remote locations for the unique IP address 60, the logical name 62, or the device table 64. Regardless, each device 32 may be dynamically allocated the unique IP address 60 and the logical name 62. Some devices 32, however, may have a predefined IP address 60 and/or logical name 62, so the device table 64 would reflect this predefined information. When the network diagnostic application 44 detects a new logical name 62, for example, the network diagnostic application 44 may assign an available, unique Internet Protocol address 60 and update the device table 64. As each device 32 is added and removed from the home network 24, the device table 64 is accordingly updated to reflect the current status or membership of the devices communicating with the residential gateway 22.

Figure 4:
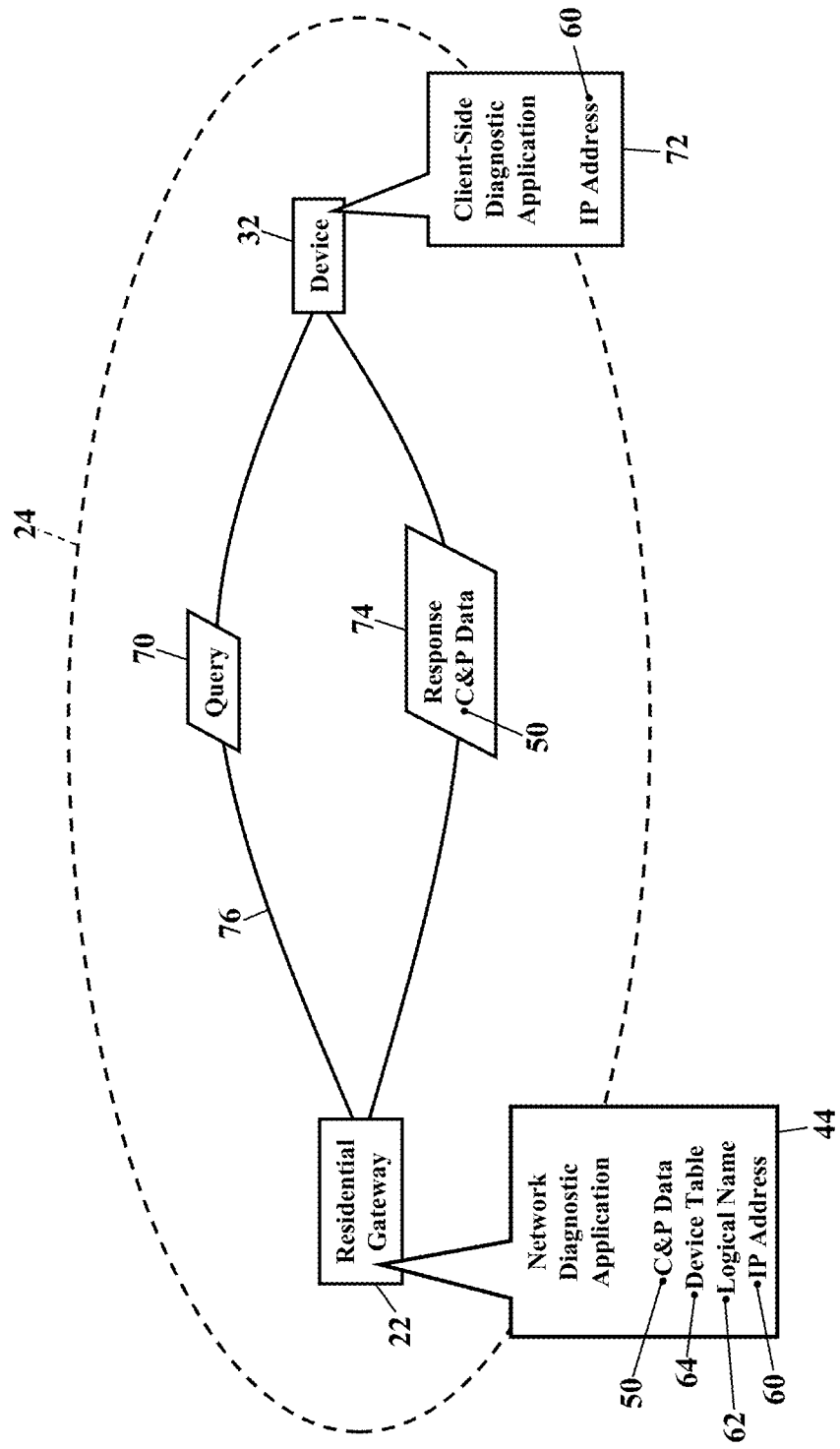
FIG. 4 is a schematic illustrating automatic diagnosis of a home network, according to exemplary embodiments.

FIG. 4 is a schematic illustrating automatic diagnosis of the home network 24, according to exemplary embodiments. The network diagnostic application 44 queries each device 32 for the configuration and performance data 50. As FIG. 4 illustrates, the network diagnostic application 44 causes the residential gateway 22 to send a query 70 to each device 32. The network diagnostic application 44, for example, queries the device table 64 for the logical name 62 and retrieves the corresponding unique IP address 60. The network diagnostic application 44 then instructs the processor 40 to route the query 70 to the corresponding unique IP address 60. The query 70 is received by the device 32 at the corresponding unique IP address 60. The query 70 commands a client-side diagnostic application 72 operating in the device 32 to send the configuration and performance data 50. The device 32 retrieves the configuration and performance data 50 and sends a response 74. The network diagnostic application 44 may repeat the query 70 for each device 32 communicating with the residential gateway 22. The query 70 may be randomly or periodically repeated for each device 32 to repeatedly obtain fresh data.

The network diagnostic application 44 uses the configuration and performance data 50 to diagnose the home network 24. The configuration and performance data 50, for example, may describe the capacity usage (e.g. in bits per second) of a communication link 76 between a device 32 and the residential gateway 22. The configuration and performance data 50 may describe a current bandwidth usage (such as bits per second) for an Ethernet physical connection or for a WI-FI® wireless connection. The network diagnostic application 44 may even combine information from different source devices 32 to characterize a single home LAN device. For example, the network diagnostic application 44 may correlate information broadcast by an IPTV set-top box with information in the residential gateway 22 to determine the physical connections used by the IPTV set-top box and their status. The network diagnostic application 44 may also measure and assess the wireless frequencies that are used by the transceiver operating in or with the residential gateway 22. Specifically, the network diagnostic application 44 may measure wireless signal strength (RSSI), adjacent or nearby wireless LANs, and noises and interference sources present in the customer premises.

Figure 5:
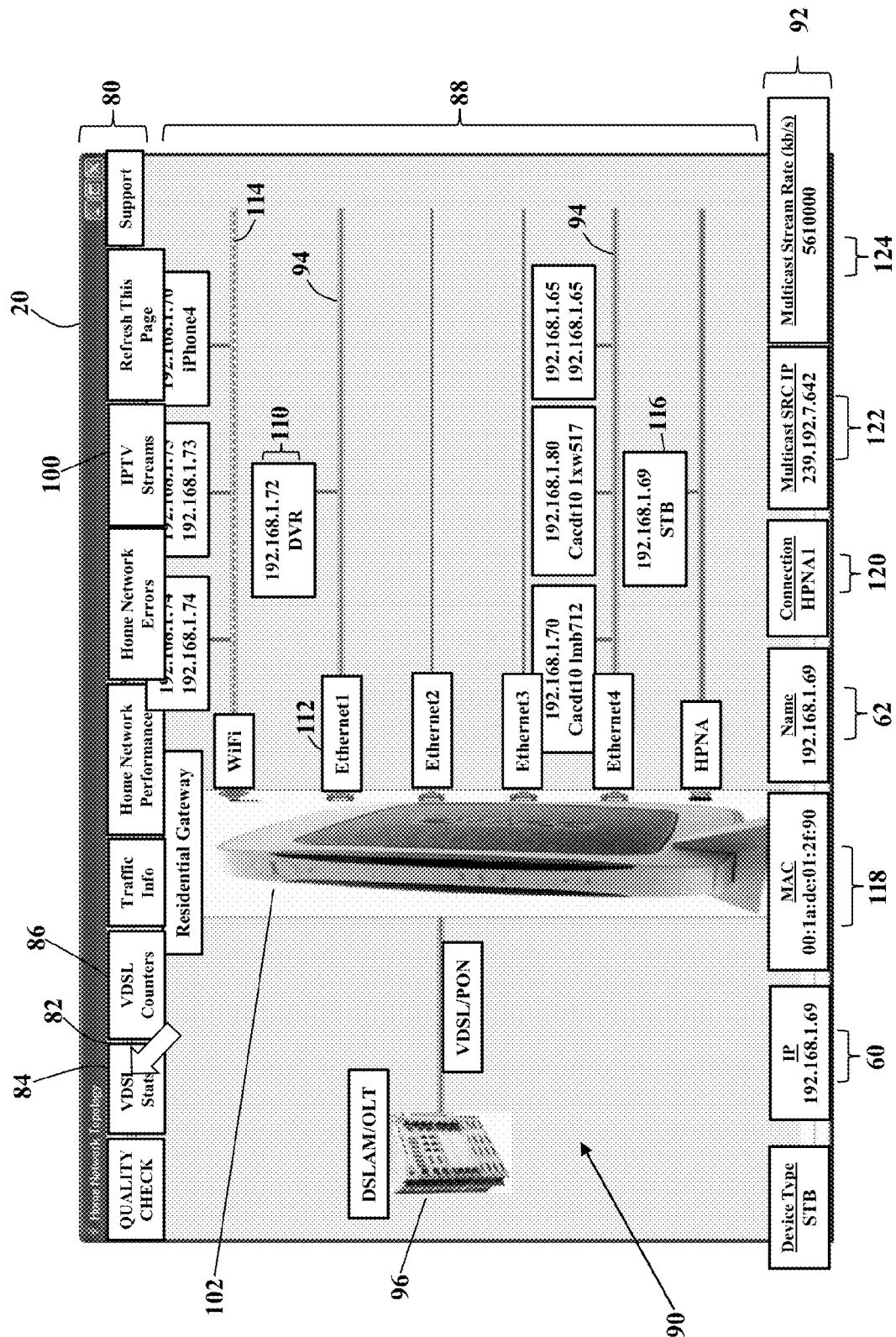
FIG. 5 is another schematic illustrating the graphical user interface, according to exemplary embodiments.

FIG. 5 is another schematic illustrating the graphical user interface 20, according to exemplary embodiments. Once the network diagnostic application 44 obtains the configuration and performance data 50 (as FIG. 4 illustrated), the network diagnostic application 44 generates the graphical user interface 20. The graphical user interface 20 is a simple, easy-to-understand home network management tool for customers and for technicians. Even novice users may quickly and easily diagnose and isolate problems in the home network 24. A more knowledgeable user (such as a repair technician) may select particular icons and/or graphical communications links to obtain more detailed technical information concerning the home network 24 and/or any of the devices 32 connected to the residential gateway 22.

The graphical user interface 20 provides detailed information but retains simplicity. The graphical user interface 20 provides a complete, but simulated, view of the home network 24, including the devices 32 and their respective communications links. The graphical user interface 20, however, also provides different visual indications to attract the user's attention when issues are detected. In this way, even the most novice of users are able to identify problems in their home network 24 using just the graphical user interface 20.

The graphical user interface 20 provides detailed information in a simple fashion. The graphical user interface 20 may be divided into three sections. A top section 80 (which may occupy about ten percent (10%) of the screen) presents several graphical tabs 82. Each tab 82 includes a category label 84. The user selects a particular tab 82 (perhaps by moving a cursor 86 and clicking or selecting the tab 82) to obtain information related to the corresponding category label 84. Any aggregated and/or conceptual information which is not associated with each specific communications link and device 32 will be pulled and displayed. A middle section 88 (which occupies about eighty percent (80%) of the screen) displays a simulated view 90 of a physical network topology of the home network (illustrated as reference numeral 24 in FIGS. 2-4). A bottom section 92 of the graphical user interface 20 (which again occupies about ten percent (10%) of the screen) presents normal information for each device 32 and communications link 94 when user selects any icon 96 in the simulated view 90.

FIG. 5, in particular, illustrates information related to an "IPTV Streams" tab 100. The IPTV Streams tab 100 illustrates information related to distribution of high-bandwidth Internet Protocol television data streams. Whereas conventional user interfaces only display a logical view of network topology, exemplary embodiments provide the simulated view 90 of the physical network topology of the home network 24. Each simulated communications link 94 or device icon 96 represents a real network entity that physically and/or wirelessly communicates with the residential gateway 22. The graphical user interface 20 thus displays the icon 96 for each device 32 and the graphical communications link 94 representing each corresponding physical or wireless communication link. The graphical user interface 20, for example, graphically illustrates a gateway icon 102 that represents the residential gateway (illustrated as reference numeral 22 in FIGS. 2-4). The graphical user interface 20 also graphically illustrates the icons 96 for each device 32 communicating with the residential gateway 22. The icons 96 may visually represent the type of each device 32 (such as a picture of a set top box). The simulated view 90 of the physical network topology is dynamically refreshed (randomly or periodically, as explained above) depending on the device 32 and/or the residential gateway's data pull capability. The graphical user interface 20 thus provides a real time view of the physical network topology of the home network 24.

Each simulated device and communications link may include a label 110. The label 110 displays the unique Internet Protocol address 60 and the logical name 62 which identifies each particular device 32 communicating with the residential gateway 22. The logical name 62 may be simple to understand, such as "DVR" (identifying a digital video recorder) or "STB" (identifying a set-top box). The graphical user interface 20 also simulates each communications link 94 and identifies its communications protocol or standard. FIG. 5, for example, illustrates each Ethernet connection 112 to/from the residential gateway 22 (such as "Ethernet 1" through "Ethernet 4") and the "Wi-Fi" wireless connection 114. The graphical user interface 20 thus displays a simple, but simulated, view of the physical network topology of the home network 24.

The graphical user interface 20, however, also provides even more detailed information. Because each device and communications link is simulated, the user may simply obtain detailed information. As FIG. 5 illustrates, the user may select any icon 96 for more detailed information. If the user mouses over, hovers over, or otherwise selects any icon 96, the bottom section 92 of the graphical user interface 20 presents more detailed information. Should the cursor 86 hover over a "Set-Top Box" icon 116, for example, the corresponding logical name 62 and its unique Internet Protocol address 60 is displayed in the bottom section 92 of the graphical user interface 20. Other detailed information may be displayed, such as a corresponding Media Access Control ("MAC") address 118, communications link or connection type 120 ("HPNA"), multicast sample rate conversion ("SRC") 122, and/or multicast stream rate 124.

Figure 6:
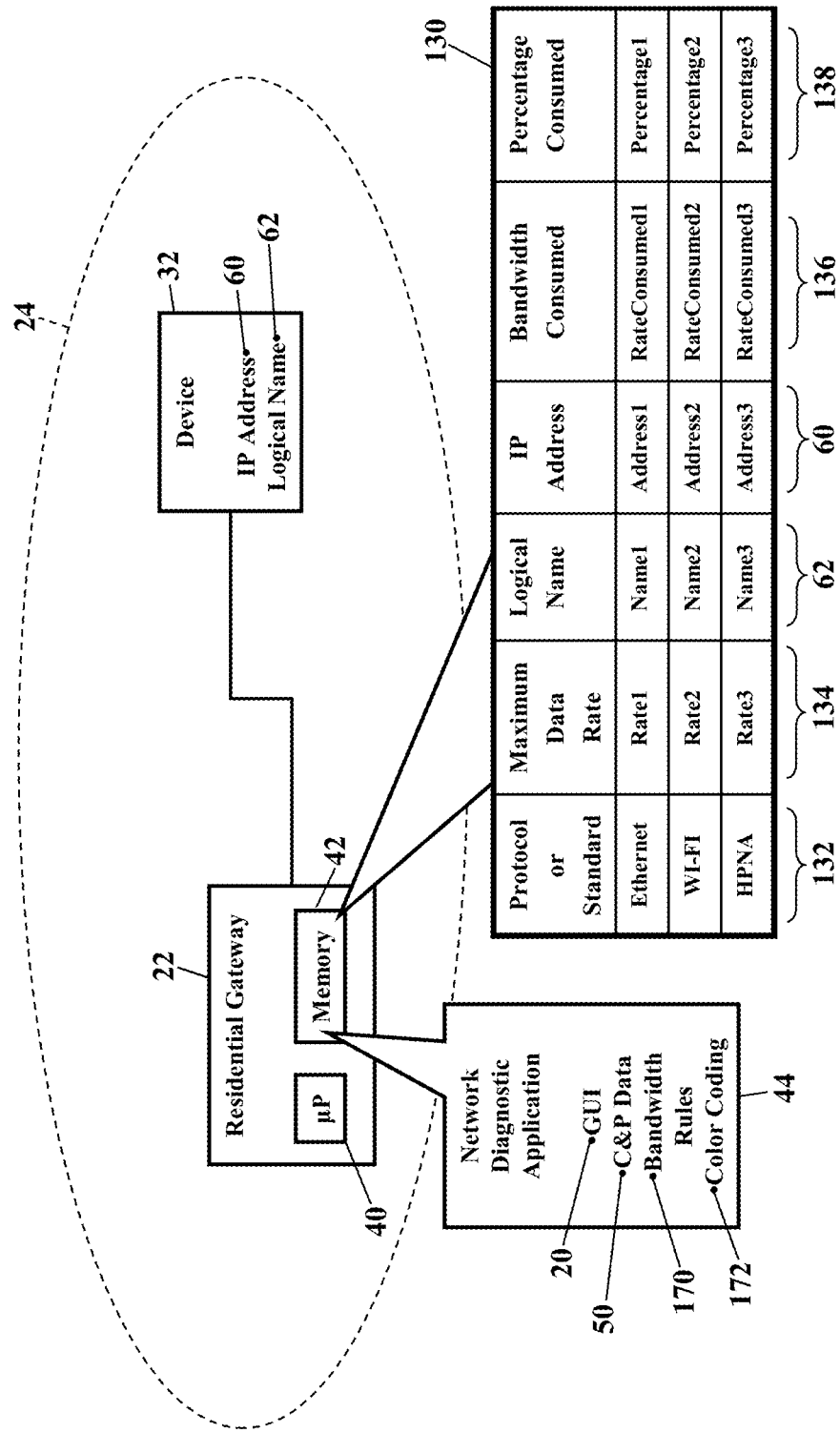
FIGS. 6-8 are schematics illustrating bandwidth usage, according to exemplary embodiments.
Figure 7:
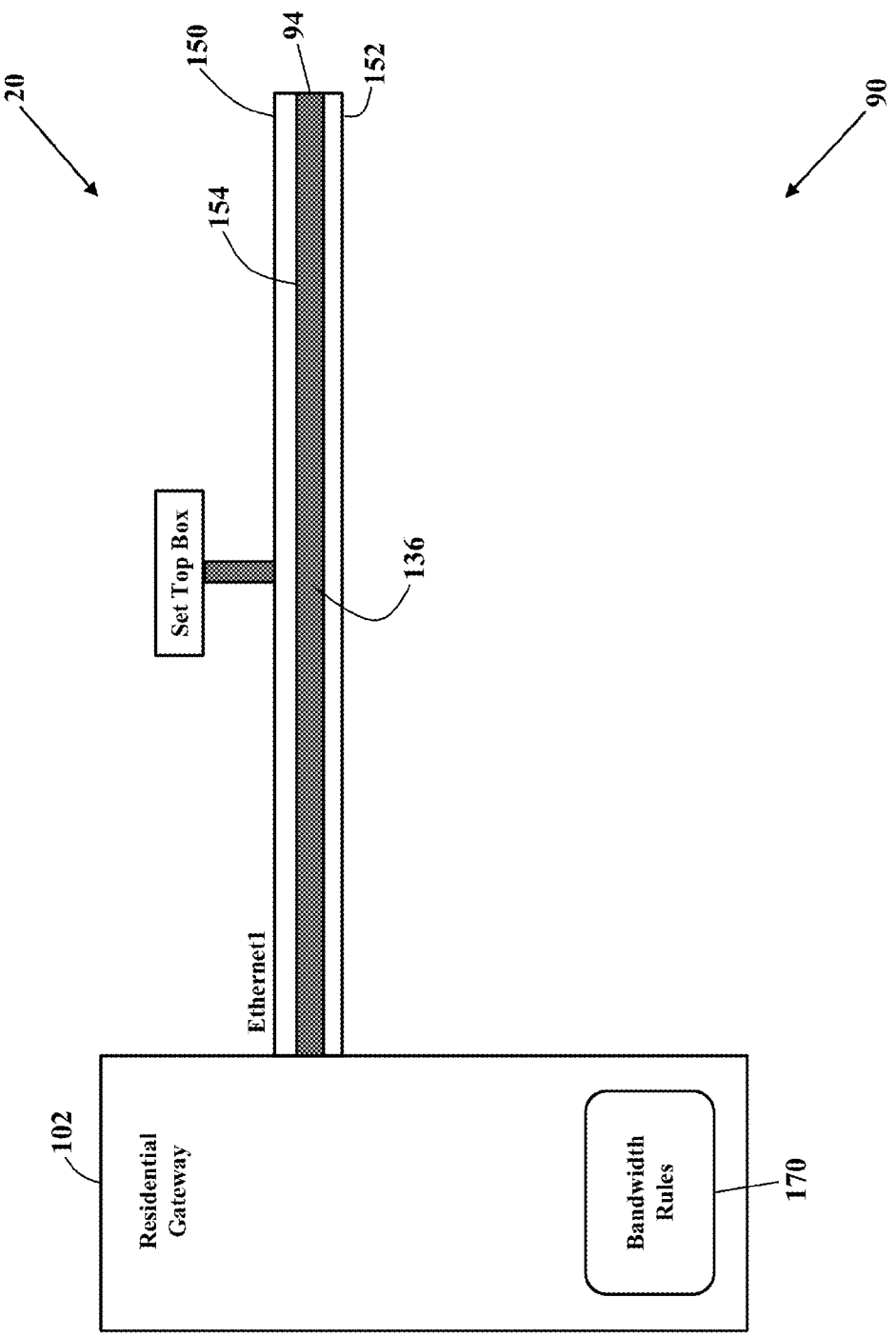
Figure 8:
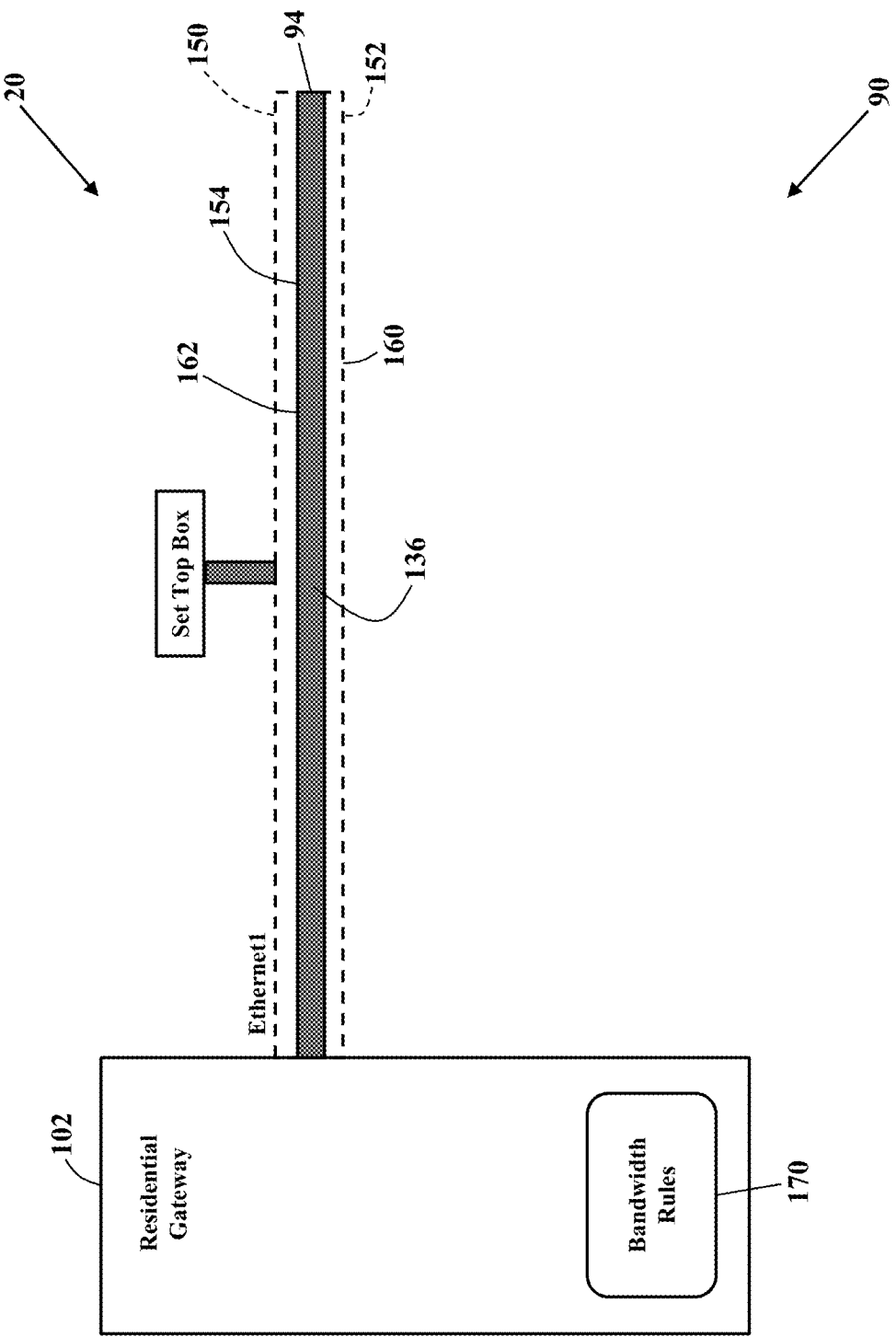

FIGS. 6-8 are schematics illustrating bandwidth usage, according to exemplary embodiments. Here exemplary embodiments provide a simple, graphical illustration of bandwidth usage in any communications link. Because the network diagnostic application 44 queries each device 32 for the configuration and performance data 50 (as FIG. 4 illustrated), the graphical user interface 20 may graphically illustrate bandwidth consumption by any device 32. When the network diagnostic application 44 receives the configuration and performance data 50, the network diagnostic application 44 is informed of the communications protocol or standard (e.g., Ethernet, WI-FI®, etc.) and the bandwidth consumption (such as the multicast stream rate 124) of each device 32. The network diagnostic application 44 then causes the graphical user interface 20 to graphically illustrate the bandwidth consumed by any device 32. Because the communications protocol or standard is known (such as reference numerals 112, 114, and 120 illustrated in FIG. 5), the network diagnostic application 44 retrieves a maximum data rate permitted by or governed by the communications protocol or standard.

As FIG. 6 illustrates, the network diagnostic application 44 queries a rate table 130 stored in the memory 42. The rate table 130 may be constructed as an extension of the device table (illustrated as reference numeral 64 in FIG. 3). The rate table 130 maps or associates the communications protocol or standard 132 to the maximum data rate 134 permitted by the communications protocol or standard 132. The network diagnostic application 44 commands the processor 40 to retrieve the maximum data rate 134 and to compare the maximum data rate 134 to the bandwidth consumed 136 by each device 32 (perhaps identified by the corresponding logical name 62 and Internet Protocol address 60 for each device 32). The network diagnostic application 44 then computes a percentage 138 of the bandwidth being consumed along any communications link and/or by any device 32. The network diagnostic application 44, for example, commands the processor 40 to determine the percentage 138 of the bandwidth being consumed as:

$$\frac{\text{Bandwidth Consumed}}{\text{Maximum Data Rate}} \times 100.$$

The percentage 138 of the bandwidth being consumed may be computed for each device 32 that communicates with the residential gateway 22. The network diagnostic application 44 commands the processor 40 to dynamically refresh the rate table 130 (either randomly or periodically) depending on the device 32 and/or the residential gateway's data pull capability. The graphical user interface 20 thus again provides a real time view of the physical network topology of the home network 24.

FIG. 7 illustrates the bandwidth consumption. FIG. 7 is a partial view of the graphical user interface 20. The features shown in FIG. 7 are enlarged for clarity. FIG. 7 illustrates how the graphical user interface 20 may simulate each communications link 94 as a pipe 150 having an outer diameter 152 and an inner diameter 154. The outer diameter 152 represents the maximum data rate that is permissible by the communications protocol or standard (illustrated, respectively, as reference numerals 134 and 132 in FIG. 6). The inner diameter 154 represents the bandwidth being consumed 136 (such as the multicast stream rate 124 illustrated in FIG. 5) by each device 32 or along each physical or wireless communications link (illustrated as reference numeral 76 in FIG. 4). The inner diameter 154 is preferably scaled to the percentage 138 of the bandwidth being consumed by the physical or wireless communications link 76. For example, if an Ethernet communications link (such as the "Ehternet4" illustrated as reference numeral 96 in FIG. 4) is consuming 50% of its maximum data rate 134, then the inner diameter 154 is scaled to be 50% of the outer diameter 152. If the "Ethernet1" communications link (illustrated in FIG. 4) is consuming 30% of its maximum data rate 134, then the inner diameter 154 is scaled to be 30% of the outer diameter 152. Thicknesses of the outer diameter 152 and the inner diameter 154 thus provide a quick and visually simple indication of bandwidth consumption.

FIG. 8 illustrates another indication of bandwidth consumption. Here the graphical user interface 20 simulates each communications link using graphical effects. Each communications link 94 is again illustrated as the pipe 150. The outer diameter 152 again represents the maximum data rate 134 that is permissible by the communications protocol or standard 132, yet here the maximum data rate 134 is illustrated using a dashed line 160. The inner diameter 154 again represents the bandwidth being consumed 136 by the communications link 94 or any device 32 along the communications link 94. The inner diameter 154 is, conversely, illustrated using a solid line 162. The solid line 162 may even lie within the outer dashed line 160 of the pipe 150 to further visually indicate bandwidth consumption.

FIGS. 6-8 also illustrate other indications of bandwidth consumption. The total bandwidth being aggregately consumed by the devices 32 cannot exceed the data rate (such as the high-bandwidth service 28 illustrated in FIG. 2) being received by the residential gateway 22. If any single device 32 requests more bandwidth that can be supplied by the residential gateway 22, then the request for content cannot be honored. When multiple devices 32 are requesting and/or receiving content, the aggregate total data rate being requested and/or consumed cannot exceed the data rate being received by the residential gateway 22. Similarly, the bandwidth along any communications link 76, or the aggregate communications links, cannot exceed the data rate being received by the residential gateway 22.

The network diagnostic application 44 may thus compare bandwidth consumption to rules 170. The rules 170 are stored in the memory 42 of the residential gateway 22. The rules 170 impose limits on data rates that may be consumed by any individual device 32 and/or by aggregate devices 32. When bandwidth consumption is less than or equal to some maximum threshold data rate, a rule 170 is satisfied. When, however, bandwidth consumption is greater than the maximum threshold data rate, the rule 170 may cause the network diagnostic application 44 to flag or indicate an error. Exemplary embodiments thus perform an automated diagnosis of the home network 24 based on the configuration and performance data 50 gathered from each device 32. The network diagnostic application 44 processes the configuration and performance data 50 and generates graphical user interface 20. The graphical user interface 20 may highlight diagnostic results that necessitate action on the part of the user or the technician.

The network diagnostic application 44 may thus cause the graphical user interface 20 to further simulate bandwidth consumption. The graphical user interface 20 may use color coding 172 to highlight or emphasize issues of concern. The network diagnostic application 44, for example, may color code any of the simulated communications link 94 and/or device icons 96 to again visually indicate bandwidth consumption. Each simulated communications link 94, for example, may be color coded to indicate bandwidth consumption. If a simulated communications link 94 is colored green, for example, bandwidth consumption is tolerable and satisfies the rule 170. If the simulated communications link 94 is colored yellow, however, bandwidth consumption is approaching the maximum threshold data rate. The bandwidth being consumed, in other words, may be within some percentage or range of maximum threshold data rate. If the simulated communications link 94 is colored red, though, bandwidth consumption may exceed the maximum threshold data rate. When bandwidth consumption may theoretically exceed the maximum threshold data rate, the graphical user interface 20 may further blink or flash the simulated communications link 94 to redundantly, but simply, indicate the content request cannot be provided. The graphical user interface 20 may thus visually emphasize any physical network entity that has experienced some threshold crossing event, thus indicating service may be impacted.

Thresholds may even be configurable. The rules 170, the maximum threshold data rate, and any associated parameters may be set and changed by the user. Default values are provided and may be selected or preconfigured. Each device 32 and/or communication link may thus be individually monitored for excessive consumption.

The graphical user interface 20 thus provides a simple, but information, real time view of the home network 24. Because most users may not be technically experienced, these users may rely on the graphical user interface 20 to isolate and locate problems in their home network 24. Even experienced technicians, though, benefit from the graphical user interface 20. The simple, but detailed, graphical user interface 20 saves time when diagnosing the home network 24, so technicians need not drill down for more technical information for each communications link and/or each device 32.

Figure 9:
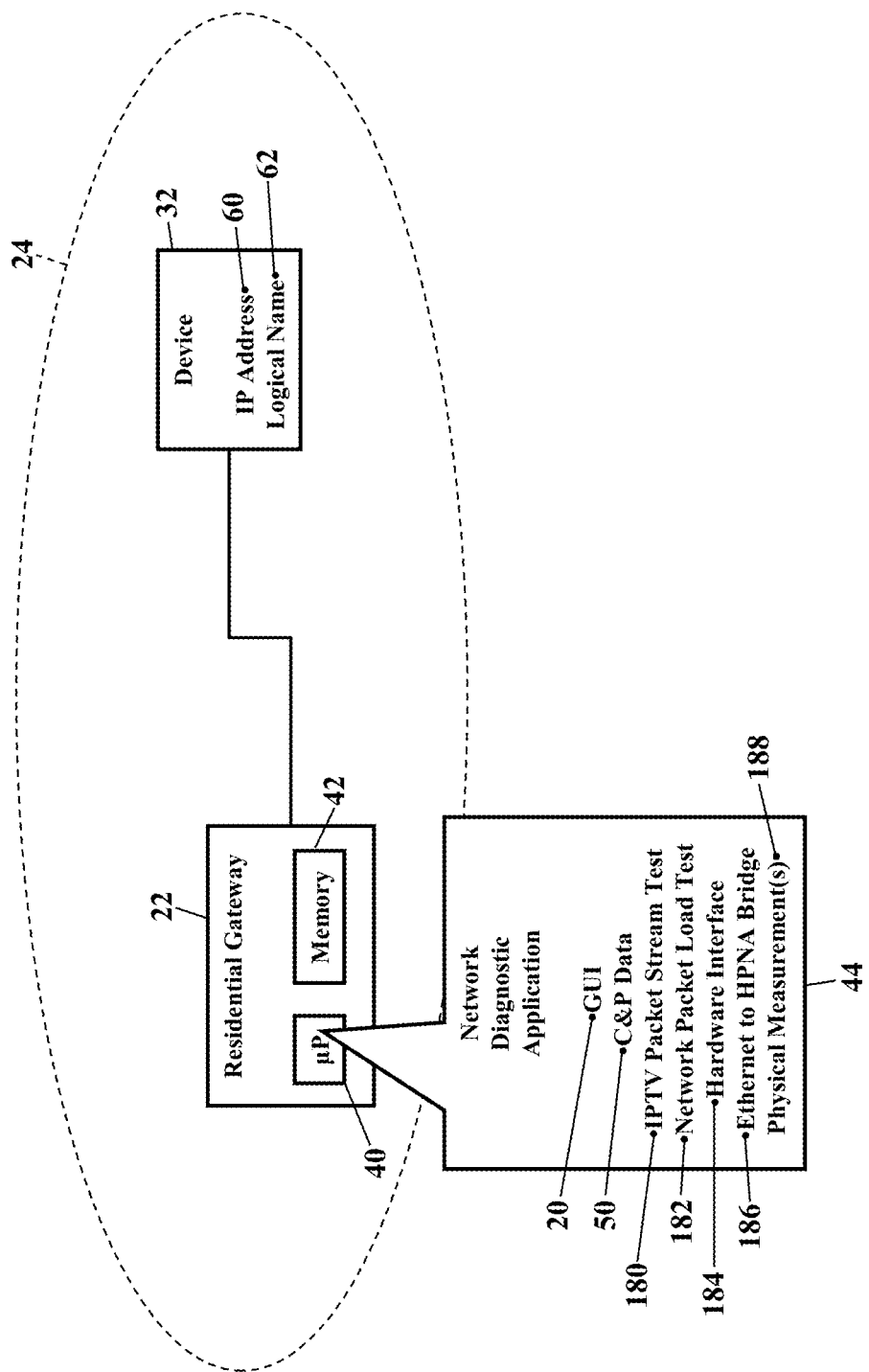
FIG. 9 is a schematic illustrating additional testing, according to exemplary embodiments.

FIG. 9 is a schematic illustrating additional testing, according to exemplary embodiments. Once the graphical user interface 20 is generated, the network diagnostic application 44 allows the technician (or advanced, permitted user) to perform any test to diagnose the home network 24. The network diagnostic application 44, for example, allows the technician to perform an IPTV packet stream test 180 based on channels that are currently tuned in by, or received by, an IPTV set-top box, digital video recorder, or any other media-consuming device. The network diagnostic application 44 may also allow the technician to perform a network packet load test 182 by generating packet traffic and by directing this traffic to a single device 32 or to multiple devices 32 within the home network 24. The technician may also connect test hardware (via hardware interface 184) for testing purposes. The technician, for example, may connect an Ethernet to HPNA bridge 186, which may perform physical measurements 188 of the home phone networking alliance communication link to the residential gateway 22. This test hardware, for example, may use the Computer Emergency Readiness Team (or "CERT") protocol to test and measure as defined in ITU-T Recommendation G.9954. These measurements may comprise data rate, signal-to-noise ratio (SNR), noise and interference power spectral density (PSD), received signal level or power, packet loss rate, packet error rate, and other related parameters that may help diagnose the home network 24.

Figure 10:
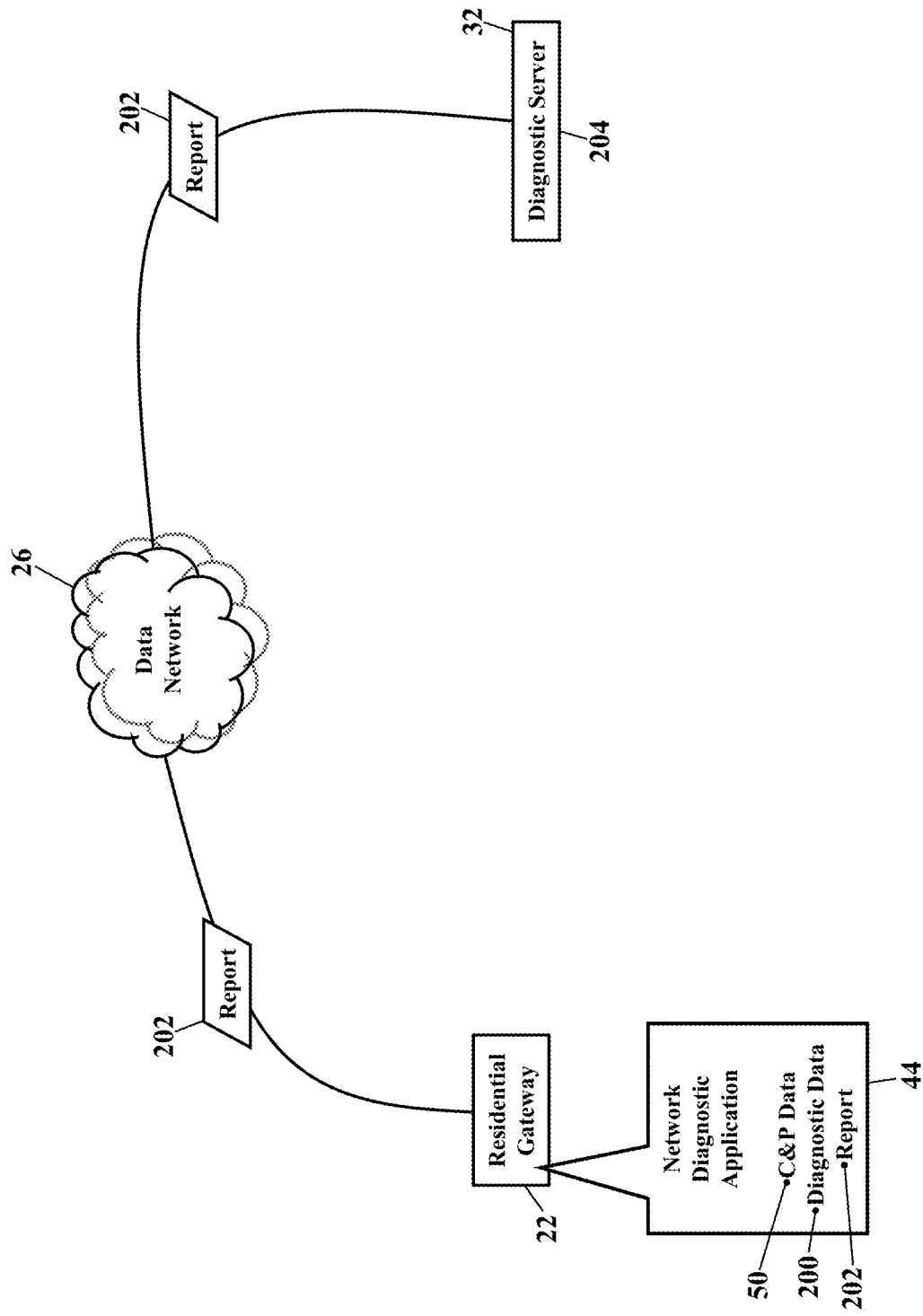
FIG. 10 is a schematic illustrating remote reporting, according to exemplary embodiments.

FIG. 10 is a schematic illustrating remote reporting, according to exemplary embodiments. Here the network diagnostic application 44 may self-report any diagnostic data 200 that describes the performance and/or operation of the home network 24. The network diagnostic application 44 may cause the processor 40 to generate a diagnostic report 202 comprising the diagnostic data 200. The diagnostic report 202, for example, may include any of the configuration and performance data 50 collected from the devices 32. The diagnostic report 202 may also include any information determined or calculated by the network diagnostic application 44, such as the device table 64 and/or the rate table 130. The diagnostic report 202 is sent via the data network 26 to a communications address (such as an Internet Protocol address) associated with a diagnostic server 204. The diagnostic report 202 is thus uploaded to the diagnostic server 204 for analysis, logging, and/or reporting. The diagnostic report 202 may include information that uniquely describes the residential gateway 22 and/or the home network 24. The diagnostic report 202 may even identify the devices 32 operating in the home network 24 and/or connected to the residential gateway 22.

Exemplary embodiments may be applied regardless of networking environment. The communications network 26 may be a cable network operating in the radio-frequency domain and/or the Internet Protocol (IP) domain. The communications network 26, however, may also include a distributed computing network, such as the Internet (sometimes alternatively known as the "World Wide Web"), an intranet, a local-area network (LAN), and/or a wide-area network (WAN). The communications network 26 may include coaxial cables, copper wires, fiber optic lines, and/or hybrid-coaxial lines. The communications network 26 may even include wireless portions utilizing any portion of the electromagnetic spectrum and any signaling standard (such as the IEEE 802 family of standards, GSM/CDMA/TDMA or any cellular standard, and/or the ISM band). The communications network 26 may even include powerline portions, in which signals are communicated via electrical wiring. The concepts described herein may be applied to any wireless/wireline communications network, regardless of physical componentry, physical configuration, or communications standard(s).

Exemplary embodiments improve workflow execution. From the perspective of the premises technician, the graphical user interface 20 allows the technician to quickly identify the physical layout of the customer's home network 24, which saves time as compared to manually sorting through tangled cables that run throughout the customer's home. The automated analysis presented by the network diagnostic application 44 affords the premises technician access to expert diagnostics and analysis without requiring technical training in these subject matters. The tool also provides a real-time data and test capability within the customer's home. Because the tool collects data from the home network 24 (e.g., the customer's LAN), the data is not subject to delay and latency of data collected from the telecommunications operator's element management systems, nor is the analysis limited to the data or parameters that are reported by such systems.

Exemplary embodiments also improve troubleshooting efforts. The optional active test capabilities (as explained with reference to FIG. 9) provide the technician with a variety of troubleshooting tools that may be used in correcting problems. For example, the IPTV packet stream test 180 may be used by the technician to perform trouble isolation to the home network 24 or to network elements outside the home. The Ethernet to HPNA bridge 186 may be used to perform physical measurements that extend or enhance the test capabilities of existing dedicated test devices. The diagnostic report 202 (as explained with reference to FIG. 10) may provide benefits to the technician by integrating the present invention with existing OSS/BSS systems.

Exemplary embodiments also benefits network service providers. The network diagnostic application 44 reduces operational expenditure and capital expenditure. On the operational side, the network diagnostic application 44 speeds up premises technician workflows and reduces multiple dispatches, failed fixes, and the like, which contribute to overall higher productivity and lower repair costs. The network service providers also benefit from improvements to repair processes in terms of customer satisfaction and churn reduction. On the capital side, the network diagnostic application 44 may allow the network service providers to reduce or defer capital expenses related to dedicated test tools used by premises technicians.

Figure 11:
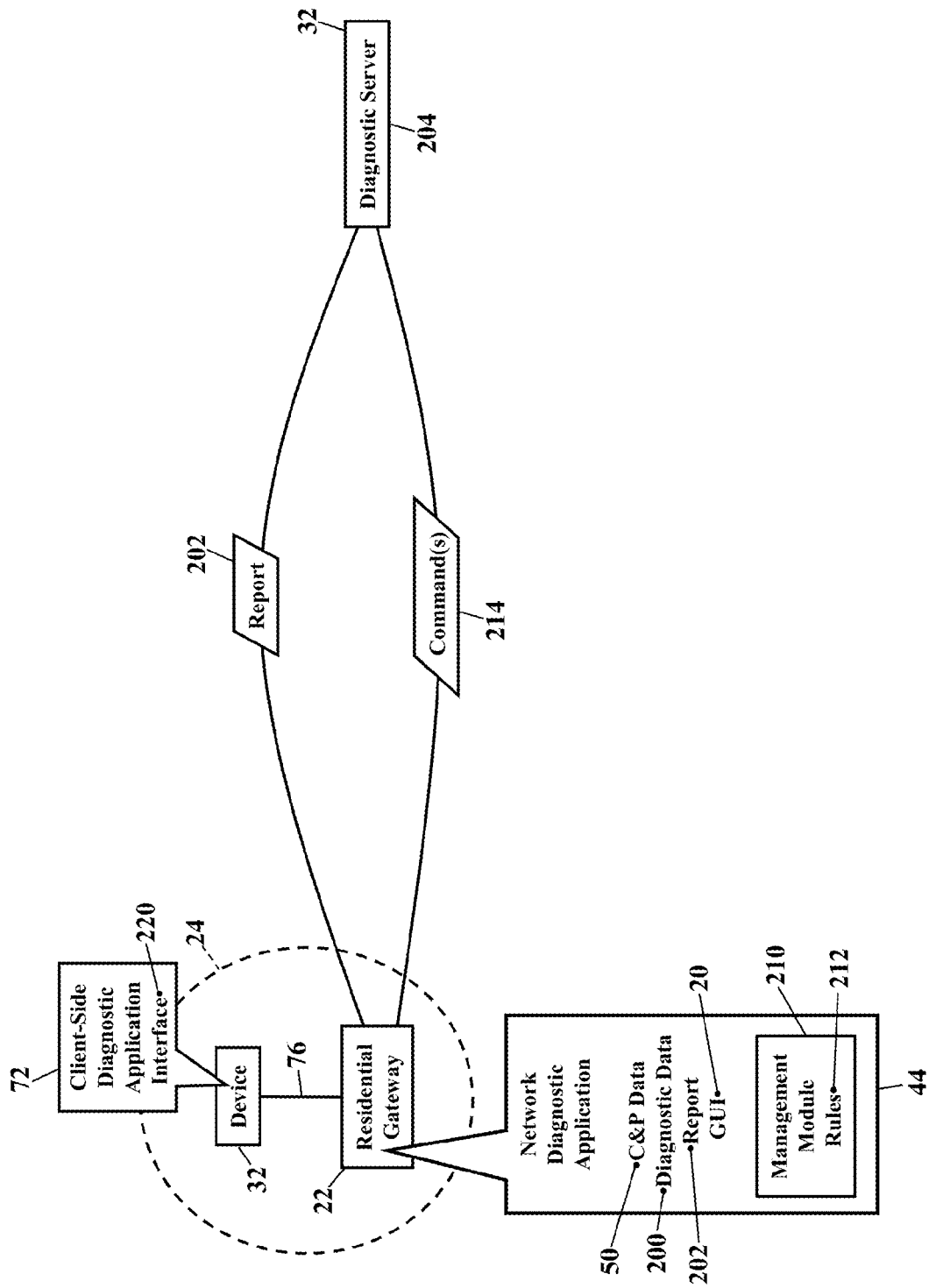
FIG. 11 is a schematic illustrating local and remote management of the home network, according to exemplary embodiments.

FIG. 11 is a schematic illustrating local and remote management of the home network 24, according to exemplary embodiments. Here the network diagnostic application 44 may actively leverage the configuration and performance ("C&P") data 50 captured by the residential gateway 22. The configuration and performance data 50 may be used to optimize bandwidth consumption and/or service quality in the home network 24. For example, once the network diagnostic application 44 self-reports the diagnostic data 200 in the diagnostic report 202, the network diagnostic application 44 may take management actions that reduce bandwidth consumption in the home network 24. The network diagnostic application 44 may additionally or alternatively improve the Quality of Service (QoS) of the home network 24.

As FIG. 11 illustrates, the network diagnostic application 44 may invoke a management module 210. The management module 210 may cooperate with the network diagnostic application 44 to make configuration changes to the home network 24. The management module 210 may include rules 212 that respond to the configuration and performance data 50 collected from the devices 32 (as explained with reference to FIGS. 4-6). The configuration and performance data 50, for example, may be compared to the rules 212. If any of the configuration and performance data 50 satisfies some rule 212, then the management module 210 may cause the network diagnostic application 44 to take an action defined by the rule 212.

As FIG. 11 also illustrates, the network diagnostic application 44 may also be remotely and/or manually commanded to take action. When the network diagnostic application 44 sends the diagnostic report 202, the network diagnostic application 44 may receive one or more commands 214. The commands 214 instruct the network diagnostic application 44 to implement some action to improve the home network 24. FIG. 11 illustrates the commands 214 remotely originating from the diagnostic server 204, but the commands 214 may additionally or alternatively originate from any management entity (such as a network operations center). The network diagnostic application 44 may also be commanded to take actions using the graphical user interface 20 and/or an interface 220 at each device 32. Access permissions may be granted to the user or to the technician to take actions that improve the performance of the home network 24, in response to the configuration and performance data 50 captured by the residential gateway 22. Moreover, the client-side diagnostic application 72 may itself take actions that improve the performance of the home network 24 or the physical communications link 76 servicing the device 32. The client-side diagnostic application 72 may also have selectable options in response to the configuration and performance data 50 captured from the device 32.

However the home network 26 is managed, the configuration and performance data 50 may be leveraged. The configuration and performance data 50 may be used to actively optimize bandwidth consumption by the device 32 and/or the physical communications link 76. The configuration and performance data 50 may be used to improve the quality of service provided to the home network 24. For example, the configuration and performance data 50 may be used to adjust video stream bandwidth and/or stream quality of the IPTV client device 32. Bandwidth and stream quality may also be adjusted based on current bandwidth data, a type of the end device 32, and/or a type of video display attached to the end device 32 (which may all be described by, or derived from, the configuration and performance data 50). Another example may move one or more high-bandwidth users from congested links to uncongested links. When a wireless communications link to the residential gateway 22 is congested, for example, one or more users may be automatically or manually switched to a HPNA or Ethernet communications link to resolve traffic congestion and thereby improve service quality. As another example, the carrier frequency of a WI-FI® transmission may be switched to a different carrier frequency in the home network 26 to reduce congestion and/or to improve signal quality. These actions may be automatically implemented via the management module 210, via the remote commands 214, and/or via manual inputs from the graphical user interface 20 and/or the interface 220 at each device 32.

Exemplary embodiments may be physically embodied on or in a computer-readable storage medium. This computer-readable medium may include CD-ROM, DVD, tape, cassette, floppy disk, memory card, and large-capacity disks. This computer-readable medium, or media, could be distributed to end-subscribers, licensees, and assignees. A computer program product comprises processor-executable instructions for diagnosing the home network 24, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A memory storing instructions that when executed by a processor cause the processor to perform a method, the method comprising:
   receiving data service from a data network at a residential gateway;
   distributing the data service from the residential gateway over a residential network to different devices;
   sending a query from the residential gateway over the residential network to each one of the different devices communicating with the residential gateway;
   receiving configuration and performance data in response to the query;
   generating a simulated view of a topology of the residential network;
   generating icons in the simulated view that represent the residential gateway and each one of the different devices;
   generating simulated communications links in the simulated view that represent communications links between the residential gateway and each one of the different devices;
   determining bandwidth being consumed by each one of the different devices communicating with the residential gateway over the residential network;
   retrieving a maximum data rate permitted by a communications protocol governing the communications links between the residential gateway and each one of the different devices;
   comparing the bandwidth being consumed by each one of the different devices to rules imposing limits on the maximum data rate permitted by the communications protocol; and
   graphically illustrating in the simulated view the maximum data rate and the bandwidth being consumed by each one of the different devices,
   wherein automated diagnosis of the residential network is performed.

2. The memory of claim 1, further comprising instructions for graphically illustrating the communications links between the residential gateway and each one of the different devices as pipes in the simulated view, each one of the pipes having an outer diameter and an inner diameter, the outer diameter representing the maximum data rate governed by the communications protocol for each one of the communications links, and the inner diameter representing the bandwidth being consumed by a respective one of the different devices utilizing a corresponding one of the communications links.

* * * * *